(12) United States Patent
Eng et al.

(10) Patent No.: US 7,531,617 B2
(45) Date of Patent: *May 12, 2009

(54) CONTINUOUS PROCESS FOR PRODUCING POLY(TRIMETHYLENE TEREPHTHALATE)

(75) Inventors: John Harvey Eng, Wilmington, DE (US); Emily A. Blum, Winterville, NC (US); Daniel Albert Green, Moylan, PA (US); Carl J. Giardino, Hixson, TN (US); Gene Parrish, Lagrange, NC (US); Robert E. Trotter, Wilmington, DE (US); Gary J. Wilson, Greenville, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 153 days.

This patent is subject to a terminal disclaimer.

(21) Appl. No.: 11/638,919

(22) Filed: Dec. 14, 2006

(65) Prior Publication Data

US 2007/0191580 A1    Aug. 16, 2007

Related U.S. Application Data

(60) Provisional application No. 60/752,479, filed on Dec. 21, 2005.

(51) Int. Cl.
C08G 63/00 (2006.01)
C08G 63/02 (2006.01)

(52) U.S. Cl. .......... 528/279; 29/594; 381/355; 381/359; 381/369; 524/800; 524/802; 528/271; 528/272; 528/274; 528/275; 528/287

(58) Field of Classification Search .......... 29/594; 381/355, 359, 369; 528/271, 272, 274, 275, 528/279, 287; 524/800, 802
See application file for complete search history.

(56) References Cited

U.S. PATENT DOCUMENTS

| | | | |
|---|---|---|---|
| 3,927,982 A | 12/1975 | Chapman et al. | |
| 4,110,316 A * | 8/1978 | Edging et al. | 526/68 |
| 6,245,879 B1 | 6/2001 | Kelsey et al. | |
| 6,277,947 B1 | 8/2001 | Kelsey et al. | |
| 6,326,456 B2 | 12/2001 | Kelsey et al. | |
| 6,353,062 B1 * | 3/2002 | Giardino et al. | 526/65 |
| 6,403,762 B1 * | 6/2002 | Duh | 528/503 |
| 6,538,076 B2 * | 3/2003 | Giardino et al. | 526/65 |
| 6,657,044 B1 | 12/2003 | Kelsey et al. | |
| 6,703,478 B2 | 3/2004 | Nakane et al. | |
| 6,887,953 B2 | 5/2005 | Eng | |
| 7,132,484 B2 * | 11/2006 | Giardino et al. | 526/65 |
| 2003/0220465 A1 | 11/2003 | Giardino et al. | |
| 2005/0065178 A1 | 3/2005 | Basha et al. | |
| 2006/0013573 A1 | 1/2006 | Phillips | |

FOREIGN PATENT DOCUMENTS

| | | |
|---|---|---|
| EP | 1 245 606 B1 | 10/2002 |
| WO | WO 01/58980 A1 | 8/2001 |

OTHER PUBLICATIONS

PCT International Search Report and Written Opinion for International Application No. PCT/US2006/048585 dated Sep. 9, 2007.

* cited by examiner

Primary Examiner—Terressa M Boykin

(57) ABSTRACT

This invention relates to a continuous process for production of poly(trimethylene terephthalate), wherein gaseous 1,3-propanediol by product resulting from the process is condensed in a condenser, and a portion of the condensed byproduct is recycled back into the process.

17 Claims, 1 Drawing Sheet

CONTINUOUS PROCESS FOR PRODUCING POLY(TRIMETHYLENE TEREPHTHALATE)

CROSS-REFERENCE TO RELATED APPLICATIONS

This application claims priority under 35 U.S.C. §119 from Provisional Application No. 60/752,479 (filed Dec. 21, 2005), the disclosure of which is incorporated by reference herein for all purposes as if fully set forth.

This application is related to application Ser. No. 11/638,978 (filed concurrently herewith), entitled "CONTINUOUS MANUFACTURE OF POLY(TRIMETHYLENE TEREPHTHALATE)", which claims priority under 35 U.S.C. §119 from Provisional Application No. 60/752,481 (filed Dec. 21, 2005); and application Ser. No. 11/638,917 (filed concurrently herewith), entitled "POLY(TRIMETHYLENE TEREPHTHALATE) CONTINUOUS MANUFACTURING PROCESS", which claims priority under 35 U.S.C. §119 from Provisional Application No. 60/752,318 (filed Dec. 21, 2005); the disclosures of which are incorporated by reference herein for all purposes as if fully set forth.

FIELD OF THE INVENTION

This invention relates to a continuous process for production of poly(trimethylene terephthalate), wherein gaseous 1,3-propanediol byproduct resulting from the process is condensed in a condenser, and a portion of the condensed byproduct is recycled back into the process.

BACKGROUND OF THE INVENTION

Poly(trimethylene terephthalate) is produced by reaction of terephthalic acid (TPA) or dimethyl terephthalate (DMT) and excess 1,3-propanediol at elevated temperatures to obtain an esterification product. This esterification product is subjected to a precondensation, and then the precondensation product is subjected to polycondensation to obtain poly(trimethylene terephthalate).

In the poly(trimethylene terephthalate) process, excess 1,3-propanediol is removed by volatilization from the precondensation and polycondensation stages. This volatilized by-product 1,3-propanediol is known to contain several additional by-products, e.g., trimethylene terephthalate cyclic dimer and poly(trimethylene terephthalate) oligomers as well as some carbonyl containing compounds. Furthermore, if the starting material for the process includes dimethyl terephthalate, there may even be small amounts of it found in the by-product 1,3-propanediol. Recycling by-product 1,3-propanediol is desirable in order to improve the efficiency and lower the costs of the process.

Recent experience in operation of continuous processes for producing poly(trimethylene terephthalate), however, has shown that solid by-products in the liquid by-product 1,3-propanediol gradually precipitate on pipes, heat exchanger walls and spray nozzles, etc. The precipitates may cause fouling, which in turn results in lower 1,3-propanediol recirculation flow rates and eventual poor spray condenser operation. This buildup of solids in the recirculation system leads to shortened operational life, increased maintenance frequency and, consequently, higher costs due to increased downtime, maintenance costs and lower overall product yields.

U.S. Pat. No. 6,353,062, U.S. Pat. No. 6,538,076, US2003-0220465A1 and US2005-0165178 A1 disclose continuous processes for preparing poly(trimethylene terephthalate) by polymerization of bis-3-hydroxypropyl terephthalate. Excess 1,3-propanediol vapors are removed from the process stream and condensed by means of a spray condenser where they are cooled by being sprayed with condensed 1,3-propanediol that has been cooled to less than 60° C., and preferably less than 50° C. The condensed 1,3-propanediol flows into a hotwell where it is combined with additional 1,3-propanediol. A portion of the liquid in the hotwell is pumped through a cooler (i.e., a heat exchanger) to the top of the condenser for use as the condensing spray. None of these documents discloses recycle of excess 1,3-propanediol.

U.S. Pat. No. 6,277,947 and U.S. Pat. No. 6,326,456 disclose processes for producing poly(trimethylene terephthalate) by esterification of terephthalic acid with trimethylene glycol in the presence of a catalytic titanium compound, followed by precondensation and polycondensation. The esterification is effected in at least two stages, wherein the first stage a total molar ratio of trimethylene glycol to terephthalic acid of 1.15 to 2.5, a content of titanium of 0 to 40 ppm, a temperature of 240 to 275° C., and a pressure of 1 to 3.5 bar are used. In the at least one subsequent stage, the content of titanium is adjusted to be higher than in the initial stage by 35 to 110 ppm. These two publications disclose recycle of excess 1,3-propanediol into a terephthalic acid/1,3-propanediol paste mixer that is typically unheated. However, the stoichiometry set forth in examples 6, 7 and 8 of both indicates clearly that the recycled 1,3-propanediol did not result from a steady state continuous process. Moreover, the process produced poly(trimethylene terephthalate) with significant color, as suggested by the use of cobalt compounds as color agents in examples 6 and 7.

These problems in recycle of 1,3-propanediol have resulted in reports (see, e.g., U.S. Pat. No. 6,657,044) that it is necessary to remove the solid by-products from the recovered by-product 1,3-propanediol in order to successfully recycle it. U.S. Pat. No. 6,657,044 teaches a process for preparation of poly(trimethylene terephthalate) by esterification of terephthalic acid or dimethyl terephthalate with 1,3-propanediol, where excess 1,3-propanediol is purified before recycle into the process. The 1,3-propanediol stream is boiled and 1,3-propanediol is separated from the high boiling byproduct fraction consisting of solids and semi-solids. The solids and semi-solids are heated in the presence of a metal catalyst which digests and converts the solid by-product to esters of terephthalic acid.

U.S. Pat. No. 6,245,879 discloses procedures for purification of a carbonyl-containing 1,3-propanediol stream for reuse in a poly(trimethylene terephthalate) process.

U.S. Pat. No. 6,703,478 and EP-B1245606 disclose a process for continuously producing an aromatic polyester comprising an aromatic dicarboxylic acid as the main dicarboxylic acid component and at least one glycol selected from the group consisting of ethylene glycol, 1,3-propanediol and 1,4-butanediol as the main glycol component through an esterification or ester exchange reaction and a polycondensation reaction, wherein the distillate containing the above glycol from the polycondensation reaction is subjected to at least flash distillation to remove low boiling substances before recycle to the esterification or ester exchange reaction.

It would be highly advantageous to the continuous poly(trimethylene terephthalate) polymerization process to be able to substantially reduce the amount of fouling due to precipitation of solids from the liquid by-product 1,3-propanediol, particularly in the precondensation stage. In addition, it would be advantageous to be able to recycle liquid by-product 1,3-propanediol into the process with minimal processing, while at the same time obtaining excellent quality poly(trimethylene terephthalate) product.

SUMMARY OF THE INVENTION

This invention is directed to a continuous process for the production of poly(trimethylene terephthalate) comprising the steps of:

(a) continuously producing poly(trimethylene terephthalate) oligomers comprising 1,3-trimethylene and terephthalate repeating units and having a degree of polymerization of from about 1.9 to about 3.5 by (i) ester exchange reaction of dimethyl terephthalate with excess 1,3-propanediol at an elevated temperature or (ii) direct esterification reaction of terephthalic acid with excess 1,3-propanediol at an elevated temperature;

(b) continuously precondensing the poly(trimethylene terephthalate) oligomers to form a poly(trimethylene terephthalate) prepolymer having an intrinsic viscosity of at least about 0.23 dl/g and gaseous by-products comprising volatilized by-product 1,3-propanediol; and (c) continuously polymerizing the poly(trimethylene terephthalate) prepolymer to form higher molecular weight poly(trimethylene terephthalate) having an intrinsic viscosity of at least about 0.55 dl/g and additional gaseous by-products comprising volatilized by-product 1,3-propanediol, wherein:

(i) the gaseous by-products and the additional gaseous by-products are condensed in at least two spray condensers to form at least two streams of condensed by-product 1,3-propanediol which are then collected in at least one hotwell, and (ii) at least a portion of the condensed by-product 1,3-propanediol without purification is fed back into the ester exchange or direct esterification reactions at one or more locations where the temperature is about 150° C. or higher.

In one preferred embodiment, the invention is directed to use of the ester exchange reaction of dimethyl terephthalate with 1,3-propanediol. In another, it is directed to the direct esterification reaction of terephthalic acid with 1,3-propanediol.

In one preferred embodiment, the gaseous by-products are condensed in at least one spray condenser to form at least one stream of condensed by-product 1,3-propanediol which is then collected in at least one hotwell, and further wherein the condensed by-product 1,3-propanediol without purification is fed back into the ester exchange or direct esterification reaction at one or more locations where the temperature is about 150° C. or higher.

In another preferred embodiment, the additional gaseous by-products are condensed in at least one spray condenser to form at least one stream of condensed by-product 1,3-propanediol which is then collected in at least one hotwell, and further wherein the condensed by-product 1,3-propanediol without purification is fed back into the ester exchange or direct esterification reaction at one or more locations where the temperature is about 150° C. or higher.

Preferably the gaseous by-products are condensed in a spray condenser to form at least one stream of condensed by-product 1,3-propanediol, the additional gaseous by-products are condensed in a spray condenser to form at least one stream of condensed by-product 1,3-propanediol, and then the condensed by-product 1,3-propanediol is collected in one or more hotwells, and wherein the condensed by-product 1,3-propanediol is then without purification fed back into the ester exchange or direct esterification reaction at one or more locations where the temperature is about 150° C. or higher.

Preferably the condensed by-product 1,3-propanediol comprises 1,3-propanediol and solid by-product comprising a mixture of trimethylene terephthalate cyclic dimer and poly(trimethylene terephthalate) oligomers.

Preferably the Hunter b color of the higher molecular weight poly(trimethylene terephthalate) is below about 11.5.

Preferably the higher molecular weight poly(trimethylene terephthalate) has an intrinsic viscosity of at least about 0.91 dl/g, more preferably at least about 0.96 dl/g.

In a preferred embodiment, the condensed by-product 1,3-propanediol from the gaseous by-products is collected in the at least one hotwell and enters the at least one hotwell at a temperature no higher than about 50° C. Preferably the temperature of the condensed by-product 1,3-propanediol entering the at least one hotwell is at about 50° C. or lower and wherein a portion of the condensed by-product 1,3-propanediol is cooled in at least one heat exchanger and then sprayed in at least one of the spray condensers. Preferably (i) the gaseous by-products are condensed in at least one spray condenser to form at least one stream of condensed by-product 1,3-propanediol which is then collected in at least one hotwell, (ii) the temperature of the condensed by-product 1,3-propanediol entering the at least one hotwell is at about 50° C. or lower, (iii) a portion of the condensed by-product 1,3-propanediol is transferred (e.g., pumped) from the hotwell into at least one heat exchanger wherein it is cooled, and is then sprayed in the at least one of the spray condensers to condense the by-product 1,3-propanediol, and (iv) at least 75 wt % of the condensed by-product 1,3-propanediol without purification is fed back into the ester exchange or direct esterification reaction at one or more locations where the temperature is about 150° C. or higher. Preferably the condensed by-product 1,3-propanediol entering the at least one hotwell is at about 45° C. or lower. Preferably the condensed by-product 1,3-propanediol entering the at least one hotwell is at least about 30° C., more preferably at least about 35° C. The extent of fouling due to precipitation of solid by-product on pipes, heat exchanger walls and spray nozzles in contact with the condensed by-product 1,3-propanediol is less than that occurring with the same process except wherein the temperature of the condensed by-product 1,3-propanediol entering the hotwell is 55° C.

In one preferred embodiment, the ester exchange or direct esterification reaction is carried out in one or more reaction vessels and the at least a portion of the condensed by-product 1,3-propanediol without purification is fed directly back into at least one of the one or more reaction vessels.

In another preferred embodiment, (i) the ester exchange or direct esterification reaction is carried out in one or more reaction vessels, (ii) product methanol or water and carryover 1,3-propanediol is removed from the one or more reaction vessels as a vapor phase, (iii) the vapor phase is separated using a column into (A) water or methanol phase and (B) a recovered 1,3-propanediol phase which is condensed into the base of the column or a separate receiving vessel and then returned to the one or more reaction vessels, (iv) and the condensed by-product 1,3-propanediol without purification is fed into the column, a receiving vessel at the base of the column, or the pipe(s) feeding the recovered condensed by-product 1,3-propanediol from the column into the reaction vessel at a point where the temperature is about 150° C. or higher, preferably into the (I) vapor phase or (II) recovered 1,3-propanediol phase.

Preferably the gaseous by-products are condensed in at least one spray condenser to form condensed by-product 1,3-propanediol comprising 1,3-propanediol and by-product solids comprising trimethylene terephthalate cyclic dimer and, optionally, poly(trimethylene terephthalate), which is then collected in at least one hotwell and wherein a portion of the condensed by-product 1,3-propanediol is cooled in at least one heat exchanger and then sprayed in the at least one spray condenser, and further wherein the total amount of trimethylene terephthalate cyclic dimer and poly(trimethylene terephthalate) in the condensed by-product 1,3-propanediol is raised at least about 0.2 weight % based on the weight of condensed by-product 1,3-propanediol.

Thus, the invention provides a continuous poly(trimethylene terephthalate) polymerization process wherein it is possible to recycle liquid by-product 1,3-propanediol into the process without purification of the recycle stream, while at the same time obtaining excellent quality poly(trimethylene terephthalate). According to preferred embodiments, this can be done while substantially reducing the amount of fouling due to precipitation of solids from the liquid by-product 1,3-propanediol.

DETAILED DESCRIPTION OF THE PREFERRED EMBODIMENTS

Figure 1:
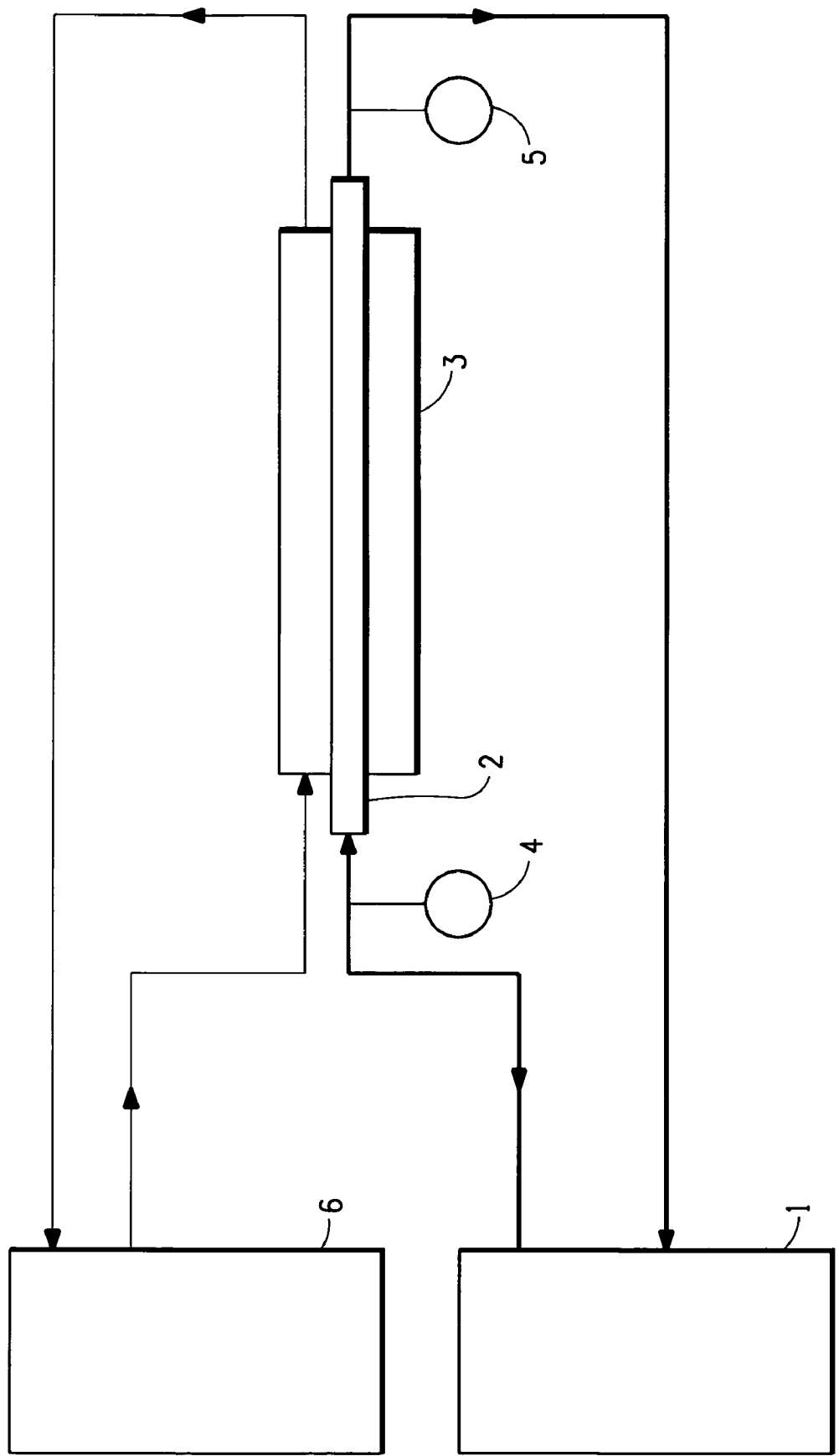
FIG. 1 is a schematic representation of an apparatus used to assess the extent of precipitation of solid by-products during the process of the invention.

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

The process of the present invention is an improved continuous process for the production of poly(trimethylene terephthalate). The process comprises the steps: (a) continuously producing poly(trimethylene terephthalate) oligomers comprising 1,3-trimethylene and terephthalate repeating units and having a degree of polymerization of from about 1.9 to about 3.5: (b) continuously precondensing the oligomers to form a poly(trimethylene terephthalate) prepolymer; (c) continuously polycondensing the poly(trimethylene terephthalate) prepolymer to form higher molecular weight poly(trimethylene terephthalate) having an intrinsic viscosity of at least about 0.55 dl/g.

The feed material for precondensation may be produced either by ester exchange from dimethyl terephthalate and 1,3-propanediol or by direct esterification from terephthalic acid and 1,3-propanediol. Both processes yield bis-3-hydroxypropyl terephthalate (referred to as "monomer") and low molecular weight polyesters of 1,3-propanediol and terephthalic acid having an average degree of polymerization of 1.9 to about 3.5 (referred to as "poly(trimethylene terephthalate) oligomers").

A preferred process for direct esterification of terephthalic acid and 1,3-propanediol is described in U.S. Pat. No. 6,887,953. Generally the direct esterification or ester exchange is carried out at temperatures of from about 235° C. to about 255° C.

Other processes for direct esterification and ester exchange are known, for instance as described in U.S. Pat. No. 6,277,947, U.S. Pat. No. 6,326,456 and U.S. Pat. No. 6,353,062. Direct esterification or ester exchange can be carried out in one or more steps (or vessels), such as using one vessel or multiples vessels (e.g., two or three) in series. In a two-step esterification process, by-product 1,3-propanediol can be added to one or both steps, but is preferably added to the first step.

The feed material for the esterification or ester exchange can contain from about 0.01 to about 0.2 mole %, based on the total number of moles of 1,3-propanediol and diacid or diester (e.g., terephthalic acid or dimethyl terephthalate), of polyfunctional reactant containing three or more carboxylic acid type groups or hydroxy groups, such as described in US2006-013573A1. The polyfunctional repeat units can be present in the same or different amounts, and may be the same or different, in each component.

If present, the polyfunctional reactant is preferably selected from the group consisting of polycarboxylic acid having at least three carboxyl groups and polyols having at least three hydroxyl groups, or mixtures thereof. Preferably the polyfunctional reactant is polycarboxylic acid having 3 to 4 carboxyl groups, more preferably having 3 carboxyl groups. Preferably the polyfunctional reactant is polyol having 3-4 hydroxyl groups, more preferably having 3 hydroxyl groups. In one embodiment the polyfunctional reactant comprises polycarboxylic acid selected from the group consisting of trimesic acid, pyromellitic acid, pyromellitic dianhydride, benzophenone tetracarboxylic acid anhydride, trimellitic acid anhydride, benzenetetracarboxylic acid anhydride, hemimellitic acid, trimellitic acid, 1,1,2,2, ethanetetracarboxylic acid, 1,2,2-ethanetricarboxylic acid, 1,3,5-pentanetricarboxylic acid, 1,2,3,4-cyclopentanecarboxylic acid, and mixtures thereof. In another embodiment the polyfunctional reactant comprises polyol selected from the group consisting of glycerine, pentaerythritol, 2-(hydroxymethyl)-1,3-propanediol, trimethylolpropane, and mixtures thereof. Most preferably the polyfunctional reactant comprises trimesic acid.

Trifunctional comonomers, for example trimellitic acid, can also be incorporated for viscosity control.

Whether the monomer/oligomer mixture described above is produced by direct esterification from terephthalic acid or ester exchange from dimethyl terephthalate, a catalyst is added prior to the esterification or transesterification reaction. Catalysts useful in the ester exchange process include organic and inorganic compounds of titanium, lanthanum, and zinc. Titanium catalysts, such as tetraisopropyl titanate and tetra n-butyl titanate are preferred and are added to the 1,3-propanediol preferably in an amount sufficient to yield from about 20 to about 200 ppm, most preferably from about 50 to about 150 ppm of titanium by weight based on the weight of the finished polymer. These levels produce relatively low levels of unreacted dimethyl terephthalate in the ester exchange reaction (less than 5% by weight based on the total weight of the exit stream from the ester exchange) and give reasonable reaction rates in the precondensation and polycondensation steps.

Catalysts useful in the direct esterification process include organo-titanium and organo-tin compounds, which are added to the 1,3-propanediol in an amount sufficient to yield at least about 20 ppm of titanium or at least about 50 ppm of tin, respectively, by weight based on the finished polymer.

Additional catalyst may be added to the monomer/oligomer mixture after the ester exchange or direct esterification reaction and prior to precondensation.

Whether the monomer/oligomer mixture is produced by direct esterification from terephthalic acid or ester exchange from dimethyl terephthalate, the degree of polymerization is preferably from about 1.9 to about 3.5.

In a preferred embodiment of the invention, the monomer/oligomer mixture is pumped from the ester exchange or direct esterification reaction stage to a precondensation stage by means of a temperature-controlled feed line equipped with pumps. In the feed lines, the monomer/oligomer mixture is maintained at a temperature of about 215° C. to about 250° C.

Precondensation can be carried out using one or more steps (or vessels), such as using one vessel or multiples vessels (e.g., two or three) in series. Examples of suitable processes that can be modified to carry out this invention are described in U.S. Pat. No. 6,277,947, U.S. Pat. No. 6,326,456, U.S. Pat. No. 6,353,062, U.S. Pat. No. 6,538,076, US2003-0220465A1 and US2005-0165178A1.

The volatilized by-product 1,3-propanediol and any other volatile by-products from the precondensation are removed through a vapor line connected to a vacuum source as a stream of gaseous by-products, and then condensed.

The by-product 1,3-propanediol vapors from precondensation typically contain other reaction by-products such as acrolein and allyl alcohol. It is desirable that the production of by-products such as acrolein and allyl alcohol be minimized because both of these compounds are highly toxic and cause irritation to the eyes and mucous membranes.

Intrinsic viscosity is an indicator of molecular weight. Intrinsic viscosity, often referred to as "IV," as discussed herein is determined in a solvent consisting of 50 wt % trifluoroacetic acid, 50 wt % dichloromethane ("TFA/CH$_2$Cl$_2$") employing a VISCOTEK FORCED FLOW VISCOMETER MODEL Y-900 to measure the IV of polymer dissolved at a concentration of 0.4% (wt/vol) in 50/50 wt % TFA/CH$_2$Cl$_2$ at 19° C. The poly(trimethylene terephthalate) prepolymer from the prepolymerization preferably has an intrinsic viscosity of at least about 0.23 dl/g and preferably up to about 0.35 dl/g, more preferably from about 0.25 to about 0.30 dl/g.

The prepolymer product is fed to a final polymerization or polycondensation stage. The major purpose of the polycondensation is to increase the molecular chain length or viscosity of the polymer. This is accomplished by using heat, agitation, vacuum and catalyst. It is desirable that the molecular weight of the finished polymer be maximized, so that further processing, e.g., solid state polymerization, can be avoided prior to fiber spinning or other forming operation.

Polycondensation can be carried out using one or more steps (or vessels), such as using one vessel or multiples vessels (e.g., two or three) in series. Examples of suitable processes that can be modified to carry out this invention are described in U.S. Pat. No. 6,277,947, U.S. Pat. No. 6,326,456, U.S. Pat. No. 6,353,062, U.S. Pat. No. 6,538,076, US2003-0220465A1 and US2005-0165178A1. The temperature of the liquid reactants in the polycondensation stage is preferably maintained at about 245° C. to about 265° C., more preferably about 255° C. to about 265° C. The pressure is maintained at about 0.5 to about 3.0 mm Hg (66 to 399 Pa). The viscosity of the finished polymer may be controlled by adjusting polycondensation pressure or other variables. The residence or hold-up time in the polycondensation stage is typically about 1 to about 3 hours. The intrinsic viscosity of the higher molecular weight poly(trimethylene terephthalate) after polycondensation is at least about 0.55, preferably at least about 0.85, more preferably at least about 0.91, more preferably at least about 0.96, and most preferably at least about 1.0 dl/g. Intrinsic viscosity can be as high as about 1.2 or more dl/g, and is typically up to about 1.15 or about 1.05 dl/g, depending on the desired end-use.

1,3-Propanediol and other gaseous by-products are produced during polycondensation as a stream of gaseous by-products and then condensed. One method for condensing the 1,3-propanediol vapors is by means of a spray condenser similar to that described above for condensing 1,3-propanediol vapors from the precondensation. The stream of condensed by-product 1,3-propanediol produced during polycondensation is collected in a hotwell.

According to a preferred embodiment of the invention, at least a portion of the streams of condensed by-product 1,3-propanediol in the hotwells, preferably at least about 75 wt % of the byproduct 1,3-propanediol (and up to 100 weight %), may be fed back into the ester exchange or direct esterification reactions without purification at a location where the temperature is greater than about 150° C. By the phrase "without purification" it is meant that there is no chemical treatment or physical separation, e.g., distillation or solids or volatiles removal, carried out on the condensed by-product 1,3-propanediol.

By the phrase "fed back into the ester exchange or direct esterification reactions" it is meant that the condensed by-product 1,3-propanediol (a) is fed directly into the reaction vessel, (b) is fed to the vapor phase coming out of the esterifier (i.e., to the column used to separate the water or methanol from the 1,3-propanediol or the base of the column), or (c) is fed to any line or small receiving vessel connecting the column and a reaction vessel used for the esterification or ester exchange, such as a line feeding the material exiting the column into a reaction vessel. Specifically excluded is feeding the condensed by-product 1,3-propanediol to the raw materials (e.g., fresh 1,3-propanediol) or the paste of raw materials that enters the first reactor.

Thus, according to this embodiment of the invention the gaseous by-products and the additional gaseous by-products are condensed in at least two spray condensers, at least one for precondensing stage and at least one for polycondensing stage, to form at least two streams of condensed by-product 1,3-propanediol which are then collected in at least one hotwell. Preferably at least one hotwell is used for the precondensation stage and at least one hotwell is used for the polycondensing stage. However, the streams of condensed by-product 1,3-propanediol from the precondensation stage and condensed by-product 1,3-propanediol from the polycondensing stage can be combined after condensing and collected in a single hotwell. At least a portion of the condensed by-product 1,3-propanediol from the precondensation stage is fed back into the ester exchange or direct esterification reactions. At least a portion of the condensed by-product 1,3-propanediol from the polycondensation stage may also be fed back into the ester exchange or direct esterification reactions, directly or after combination with the condensed by-product 1,3-propanediol from the precondensation stage.

The finished polymer may be pelletized or fed directly to a forming operation, such as fiber spinning, film formation or molding operation. Fibers made from the poly(trimethylene terephthalate) produced by the process of the invention have properties which make them useful in various textile applications, including the manufacture of carpet or apparel.

Various additives also may be used in the process of the invention. These may include color inhibitors, such as phosphoric acid, delustrants, such as titanium dioxide, dyeability modifiers, pigments and whiteners. If separate ester exchange and polymerization catalysts are used, phosphoric acid or other color inhibitors may be added to minimize or prevent the color forming property of the ester exchange catalyst. One advantage of the process of this invention is that it is generally not necessary to use color inhibitors or stabilizers, such as phosphoric acid, organophosphites, phenols, amines, and whiteners, such as those used in order to reduce acrolein and allyl alcohol or to improve polymer color.

As has been pointed out in U.S. Pat. No. 6,657,044 and U.S. Pat. No. 6,245,879, the streams of condensed by-product 1,3-propanediol generally contain small amounts of carbonyl compounds such as acrolein as well as small amounts of solid and semi-solid by-products, hereinafter collectively described as "solid by-products". The solid by-products have been characterized as comprising trimethylene terephthalate cyclic dimer and poly(trimethylene terephthalate) oligomers. Moreover, if the starting material for the process includes dimethyl terephthalate, there may even be small amounts of dimethyl terephthalate found in the recovered 1,3-propanediol.

U.S. Pat. No. 6,657,044 and U.S. Pat. No. 6,245,879 further indicate that in order to obtain high quality poly(trimethylene terephthalate) when recycling the condensed by-product 1,3-propanediol, it is necessary to purify the condensed by-product 1,3-propanediol to remove the carbonyl compounds and solid by-products. However, it has now been found that the preferred embodiment process of the invention allows the condensed by-product 1,3-propanediol to be recycled to the esterification or ester exchange reactions without purification and still produce poly(trimethylene terephthalate) with quality suitable for use in the conventional end-use applications such as fibers, films and molding applications. Indeed it has been found that both the viscosity and color characteristics of the poly(trimethylene terephthalate) product prepared using recycled 1,3-propanediol from the process of the invention without purification, are essentially the same as that prepared in the same way but without recycling the 1,3-propanediol.

It has been found that during long term operation of a continuous process for preparation of poly(trimethylene terephthalate) by the processes disclosed in U.S. Pat. No. 6,538,076 and U.S. Pat. No. 6,353,062, some precipitation of the solid by-products may occur. As these precipitates build up over time on the pipes, heat exchanger walls and spray nozzles, etc. in contact with the condensed by-product 1,3-propanediol, they may cause fouling, which results in lower flow rates and eventual deleterious spray condenser operation with subsequent loss of vacuum. This problem is most notable in the precondensation stage of the process. The result is increased downtime due to the need to shut down in order to remove the precipitated solids.

According to a preferred embodiment, the process of the invention provides two methods to minimize or eliminate the deleterious precipitation of by-product solids (which can be used individually or together). In the first preferred embodiment, it has been found that in spite of the general higher solubility of solids at higher temperatures, precipitation and fouling in this process is minimized if the condensed by-product 1,3-propanediol is collected in a hotwell and cooled in a heat exchanger under conditions such that the temperature of the condensed by-product 1,3-propanediol entering the hotwell is no higher than about 50° C., preferably 35-45° C. This has been confirmed in operations where it has been shown that run life can be extended by several months due to lower fouling rates when this process improvement is utilized.

In the second preferred embodiment, which can be used in combination with or without the first embodiment, it has been found that fouling downstream of the heat exchanger is minimized if the by-product solids level, specifically the amount of trimethylene terephthalate cyclic dimer and poly(trimethylene terephthalate), in the condensed by-product 1,3-propanediol is raised, and is maintained at a level preferably from 1 to about 10 wt %, based on the weight of condensed by-product 1,3-propanediol. The specific amount of trimethylene terephthalate cyclic dimer and poly(trimethylene terephthalate) that should be used will vary depending upon the starting materials and process conditions. For instance, the presence of dimethyl terephthalate ("DMT") increases fouling and higher levels of trimethylene terephthalate cyclic dimer and poly(trimethylene terephthalate) seem to be necessary when DMT is used. DMT is preferably present in the condensed by-product 1,3-propanediol from the precondensation stage (and also preferably from the polycondensation stage) at levels of about 0.3 wt % or less, more preferably about 0.2 wt % or less, and most preferably about 0.1 wt % or less, with 0% being most preferred (e.g., when terephthalic acid is used). Typically, the preferred total amount of trimethylene terephthalate cyclic dimer and poly(trimethylene terephthalate) in the condensed by-product 1,3-propanediol is raised at least about 0.2 to about 7 wt %, based on the weight of condensed by-product 1,3-propanediol. Under some circumstances, at least about 0.3, at least about 0.5, and even higher amounts such as at least about 0.7, or at least about 1 wt %, can be preferred. In addition, raising it less, such as about 6 wt % or less, about 5 wt % or less, about 3 wt % or less, about 2 wt % or less, and 1.5 wt % or less, can be preferred.

In one way of practicing this second method, preferably high solids-containing condensed by-product 1,3-propanediol from the polycondensation hotwell (which generally contains the highest level of solids) can be transferred back to the precondensation hotwell(s) (consecutively from the last precondensation hotwell to the first precondensation hotwell) in order to raise solids levels in the precondensation hotwells. In this regard, it should be noted that about 10 to about 30 times as much gaseous by-product 1,3-propanediol is produced during precondensation than during polycondensation, so that proportionally small amounts of condensed by-product 1,3-propanediol from the polycondensation stage can be added to the condensed by-product 1,3-propanediol from the precondensation stage. This can be via direct addition during the process or by storing some or all of the condensed by-product 1,3-propanediol from the polycondensation and, optionally, treating it prior to use. A second approach, preferably involves filtering and withdrawing a portion of the 1,3-propanediol out of the recirculating mixture of condensed by-product 1,3-propanediol and trimethylene terephthalate cyclic dimer to raise the solids content of the resulting recirculating 1,3-propanediol. In a third way, finely ground poly(trimethylene terephthalate) and/or trimethylene terephthalate cyclic dimer are added to the recirculating condensed by-product 1,3-propanediol.

EXAMPLES

The following examples are presented for the purpose of illustrating the invention and are not intended to be limiting. All parts, percentages, etc., are by weight unless otherwise indicated.

Measurement of polymer L, a, and b colors was performed using a HUNTERLAB LABSCAN XE with DP-9000 system. The DP-9000 performs integration of reflectance values over the visible spectrum to arrive at CIE tristimulus X, Y and Z values as outlined in publication CIE 15.2 and ASTM Method E308. The tristimulus X, Y and Z values are used to calculate Hunter L, a, and b values.

Example 1

This example demonstrates preparation of high quality poly(trimethylene terephthalate) in a continuous process where the condensed by-product 1,3-propanediol and other by-products are recycled back to the esterification reaction without purification.

A self-circulating esterifier designed as described in U.S. Pat. No. 3,927,982 was operated at about 245° C. and a process pressure of between 4 and 5 psig (129 to 136 kPa). Fresh 1,3-propanediol was continuously loaded into a 500 lb (227 kg) capacity feed tank from which it was fed to make paste. A paste containing fresh 1,3-propanediol and terephthalic acid at a mole ratio of about 1.5 (35.5 kg/h terephthalic acid and 24.4 kg/h 1,3-propanediol), and TYZOR® TPT catalyst at a level of 33 ppm Ti (relative to final polymer) was continually injected into the esterifier at a polymer production rate of 44.1 kg/h (97 lb/h). Water and 1,3-propanediol vapors were continually extracted into a distillation column where the water and other by-products were separated from 1,3-propanediol. The 1,3-propanediol that condensed from the distillation column was collected into a heated esterifier condensate receiver that was maintained at a temperature of 165° C. or higher. The 1,3-propanediol in the receiver was returned back to the esterifier to maintain an oligomer degree of polymerization of about 3.0 as described in U.S. Pat. No. 6,887,953. Any excess 1,3-propanediol in the receiver, above that needed to maintain a degree of about 3.0, was recycled back to the 1,3-propanediol feed tank where it was mixed with fresh 1,3-propanediol and then fed to make paste. Oligomer from the esterifier was continually withdrawn and an additional 33 ppm Ti (relative to final polymer and in the form of TYZOR® TPT catalyst) and 34.5 mL/min of 20 wt % $TiO_2$ in 1,3-propanediol was injected into the oligomer before it was passed through two precondensation vessels (in series) and a polycondensation vessel. Processing of the oligomer was accomplished by the method described in U.S. Pat. No. 6,538,076 to produce poly(trimethylene terephthalate) with intrinsic viscosities (IV) between 0.90 and 0.94 dl/g.

1,3-Propanediol (about 8.1 kg/h) and other by-products were continuously vaporized and removed from the precondensation and polycondensation vessels. Vapors from the two precondensation vessels were condensed in spray condensers and collected in a precondensation hotwell. Vapor from the polycondensation vessel was condensed and collected in an adjacent polycondensation hotwell. Liquid, comprised mostly of 1,3-propanediol, overflowed from the precondensation hotwell into the polycondensation hotwell. Solids (cyclic dimer and poly(trimethylene terephthalate)) in the polycondensation hotwell were measured at levels between 0.80 and 2.0 wt %.

After establishing stable polymer production, 1,3-propanediol from the polycondensation hotwell was recycled at a rate of 100 mL/min (about 6.3 kg/h) into the heated esterifier condensate receiver, which corresponded to a recycle rate of approximately 77.5%. This mode of recycle was maintained for over 6 days. Liquid in the heated esterifier condensate receiver remained clear throughout the demonstration, indicating that any solids in the condensed by-product 1,3-propanediol were able to dissolve.

Using only fresh 1,3-propanediol for making paste, polymer L and b colors were measured to be approximately 83.2 and 6.5, respectively. After beginning recycle, polymer L and b colors changed only slightly to 82.1 and 7.1, respectively. The direct recycle of 1,3-propanediol from the precondensation and finisher hotwells in this manner thus provided an effective method for recycling 1,3-propanediol to make high quality polymer without purification of the recycled 1,3-propanediol or additional handling and additives, as recommended in literature.

Procedures for Examples 2-9 and Comparative Examples 1 and 2

Examples 2-9 and Comparative Examples 1 and 2 are concerned with determining the amount of precipitation of polymerization by-products, chiefly trimethylene terephthalate cyclic dimer in recirculating 1,3-propanediol. The apparatus used for these examples is described below.

The apparatus was a temperature-controlled circulating bath as illustrated in FIG. 1. For Examples 2 and 3 and Comparative Example 1, the bath 1 contained approximately 3.5 liters of 1,3-propanediol mixed with 1 wt. % trimethylene terephthalate cyclic dimer. The exit of the circulating bath was attached to a straight 0.25 inch internal diameter glass tube 2 of a water-cooled heat exchanger. Cold water from a second circulating bath 6 was passed through the jacket 3 along the outside of the glass tube. The heated mixture of 1,3-propanediol and trimethylene terephthalate cyclic dimer was circulated through the inner glass tube 2 at an initial flow rate of approximately 550 cc/min. Thermocouples 4 and 5 were mounted at the inlet and outlet respectively of the glass tube. After 24 hours continuous operation, the inner glass tube was removed and rinsed with water. After rinsing, a layer of white precipitate adhered to the inside of the inner glass tube.

In operation, the inlet and outlet 1,3-propanediol/trimethylene terephthalate cyclic dimer mixture temperatures were monitored. As precipitation and fouling occurred to the point of restricting flow, a gradual decrease in flow resulted in increased cooling or a lower outlet temperature. Consequently, the difference in outlet temperature between the beginning and the end of the test was taken as a measure of the amount of precipitation.

For Examples 4-9 and Comparative Example 2, the exit of the circulating bath was attached to a 12.5 inch long by 5/32 inch inner diameter glass tube 2 that was inserted inside of a 9.38 inch long by 1 inch inner diameter glass tube 3. The heated mixture of 1,3-propanediol and trimethylene terephthalate cyclic dimer was circulated through the inner glass tube 2 at approximately 340 cc/min, and cooling water from a second circulating bath 6 was passed through the outer glass tube 3.

Examples 2 and 3 and Comparative Example 1

In Comparative Example 1, the mixture of 1,3-propanediol and trimethylene terephthalate cyclic dimer was circulated through a 0.25 inch inner diameter glass tube 2 at an inlet temperature of 55.2° C., and in Examples 2 and 3 at 45.3° C. and 39.7° C. respectively. The results are in Table 1.

TABLE 1

|  | Comp. Exp. 1 | Exp. 2 | Exp. 3 |
| --- | --- | --- | --- |
| Wt % Cyclic Dimer | 1.0 | 1.0 | 1.0 |
| Inlet Temp. (° C.) | 55.2 | 45.3 | 39.7 |
| Initial Outlet Temp. (° C.) | 53.3 | 43.7 | 38.2 |
| Test Duration (Hrs.) | 24 | 24 | 24 |
| Final Outlet Temp. (° C.) | 52.3 | 43.7 | 38.2 |
| Outlet Temp. Drop (° C.) | 1 | 0 | 0 |

In the comparative example, where the circulation temperature was above 50° C. entering the heat exchanger, precipitation and fouling occurred to the point of restricting flow as evident from the increased cooling after 24 hours, i.e. lower outlet temperature. In contrast, in examples 2 and 3, where the circulation temperature was below about 50° C., there was essentially no decrease in outlet temperature, which is indicative of no, or minimal fouling. This indicated that maintenance of the circulating condensed by-product 1,3-propanediol at temperatures no higher than about 50° C. minimizes the amount of fouling caused by precipitation of cyclic dimer.

Examples 4-7

These examples were carried out with an apparatus utilizing a 5/32 inch inner diameter outlet tube 2 instead of the 0.25 inch outlet tube used in Examples 2 and 3. It was therefore expected that the effect of fouling on flow restriction should be greater in these examples than in the previous ones. The results are in Table 2.

TABLE 2

|  | Exp. 4 | Exp. 5 | Exp. 6 | Exp. 7 |
| --- | --- | --- | --- | --- |
| Wt % Cyclic Dimer | 1.0 | 1.0 | 1.5 | 5.0 |
| Inlet Temp. (° C.) | 49.9 | 45.0 | 50.0 | 45.5 |
| Initial Outlet Temp. (° C.) | 47.0 | 42.0 | 46.0 | 41.5 |
| Test Duration (Hrs.) | 24 | 24 | 24 | 24 |
| Final Outlet Temp. (° C.) | 45.5 | 41.1 | 45.4 | 40.7 |
| Outlet Temp. Drop (° C.) | 1.5 | 0.9 | 0.6 | 0.8 |

As expected, the effect of the lower diameter tube in these examples was to somewhat increase the observed outlet temperature drop. However, comparison of the results of Examples 5, 6 and 7 to those of Example 4 indicate that when the circulation temperature was less than about 50° C., the amount of precipitation/fouling was less than it was at about 50° C. as evident from the temperature drops. Thus, in addition to demonstrating the advantages of use of a lower temperature, it was unexpectedly discovered that by increasing the content of cyclic dimer the fouling was decreased.

Examples 8 and 9 and Comparative Example 2

These examples illustrate the effect on precipitation and fouling of increasing the solids level of trimethylene terephthalate cyclic dimer and poly(trimethylene terephthalate). The examples were carried out using the same apparatus described above for Examples 4, 5, 6, and 7.

In all of these examples a low level of dimethyl terephthalate (DMT) was included in the 1,3-propanediol mixture to simulate the situation where dimethyl terephthalate is used as the starting material for preparation of poly(trimethylene terephthalate). The poly(trimethylene terephthalate) used in these examples had an intrinsic viscosity of 1.02 dl/g and was cryoground and screen filtered to above 80 mesh in Example 9 and to between 60 and 80 mesh in Example 8.

The results are in Table 3.

TABLE 3

|  | Comp. Exp. 2 | Exp. 8 | Exp. 9 |
| --- | --- | --- | --- |
| Wt % Cyclic Dimer | 1.0 | 1.0 | 1.0 |
| Wt % DMT | 0.2 | 0.2 | 0.2 |
| Wt % PTT | 0 | 1.0 | 1.0 |
| PTT Mesh Size | — | 60-80 | >80 |
| Inlet Temp. (° C.) | 50.0 | 50.4 | 50.5 |
| Initial Outlet Temp. (° C.) | 47.0 | 47.7 | 47.0 |
| Test Duration (Hrs.) | 24 | 90 | 65 |
| Final Outlet Temp. (° C.) | 43.5 | 43.5 | 43.7 |
| Outlet Temp. Drop (° C.) | 3.5 | 4.0 | 2.3 |

Comparison of Example 4 with Comparative Example 2 shows that the addition of small amounts of dimethyl terephthalate accelerates fouling. Thus, the inlet temperature of 50° C., which was acceptable without the presence of dimethyl terephthalate (example 4) is less acceptable in the presence of dimethyl terephthalate (Comparative Example 2) and a lower inlet temperature should be maintained when dimethyl terephthalate is present. However, the results of Examples 8 and 9 demonstrate that by increasing the solids level, particularly the trimethylene terephthalate cyclic dimer and poly(trimethylene terephthalate) levels, in the circulating 1,3-propanediol by addition of 1 wt % poly(trimethylene terephthalate) it was possible to reduce the level of precipitation/fouling as measured by outlet temperature drop (i.e., when precipitation and fouling occur, restricted flow causes increased cooling or a larger outlet temperature drop). It should be noted that in Example 9, recirculation was carried out for 65 hours as compared to only 24 hours for Comparative Example 2, but in spite of this resulted in a lower level of fouling. In the case of Example 8, recirculation was carried out for 90 hours and resulted in about the same level of precipitation as observed in Comparative Example 2 after 24 hours.

The forgoing disclosure of the embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A continuous process for the production of poly(trimethylene terephthalate) comprising the steps of:
   (a) continuously producing poly(trimethylene terephthalate) oligomers comprising 1,3-trimethylene and terephthalate repeating units and having a degree of polymerization of from about 1.9 to about 3.5 by (i) ester exchange reaction of dimethyl terephthalate with excess 1,3-propanediol at an elevated temperature or (ii) direct esterification reaction of terephthalic acid with excess 1,3-propanediol at an elevated temperature;
   (b) continuously precondensing the poly(trimethylene terephthalate) oligomers to form a poly(trimethylene terephthalate) prepolymer having an intrinsic viscosity of at least about 0.23 dl/g and gaseous by-products comprising volatilized by-product 1,3-propanediol; and
   (c) continuously polymerizing the poly(trimethylene terephthalate) prepolymer to form higher molecular weight poly(trimethylene terephthalate) having an intrinsic viscosity of at least about 0.55 dl/g and additional gaseous by-products comprising volatilized by-product 1,3-propanediol,
wherein:
   (i) the gaseous by-products and the additional gaseous by-products are condensed in at least two spray condensers to form at least two streams of condensed by-product 1,3-propanediol which are then collected in at least one hotwell, and
   (ii) at least a portion of the condensed by-product 1,3-propanediol without purification is fed back into the ester exchange or direct esterification reactions at one or more locations where the temperature is about 150° C. or higher.

2. The process of claim 1, wherein the gaseous by-products are condensed in a spray condenser to form at least one stream of condensed by-product 1,3-propanediol, the additional gaseous by-products are condensed in a spray condenser to form at least one stream of condensed by-product 1,3-propanediol, and then the condensed by-product 1,3-propanediol is collected in one or more hotwells, and wherein the condensed by-product 1,3-propanediol is then without purification fed back into the ester exchange or direct esterification reaction at one or more locations where the temperature is about 150° C. or higher.

3. The process of claim 1, wherein the condensed by-product 1,3-propanediol comprises 1,3-propanediol and solid by-product comprising a mixture of trimethylene terephthalate cyclic dimer and poly(trimethylene terephthalate) oligomers.

4. The process of claim 1, wherein the Hunter b color of the higher molecular weight poly(trimethylene terephthalate) is below about 11.5.

5. The process of claim 1, wherein the higher molecular weight poly(trimethylene terephthalate) has an intrinsic viscosity of at least about 0.91 dl/g.

6. The process of claim 1, wherein the condensed by-product 1,3-propanediol from the gaseous by-products and additional gaseous by-products is collected in the at least one hotwell and enters the at least one hotwell at a temperature no higher than about 50° C.

7. The process of claim 1, wherein (i) the gaseous by-products are condensed in at least one spray condenser to form at least one stream of condensed by-product 1,3-propanediol which is then collected in at least one hotwell, (ii) the temperature of the condensed by-product 1,3-propanediol entering the at least one hotwell is at about 50° C. or lower, (iii) a portion of the condensed by-product 1,3-propanediol is transferred from the hotwell into at least one heat exchanger wherein it is cooled, and is then sprayed in the at least one of the spray condensers to condense the gaseous byproducts, and (iv) at least 75 weight % of the condensed by-product 1,3-propanediol without purification is fed back into the ester exchange or direct esterification reaction at one or more locations where the temperature is about 150° C. or higher.

8. The process of claim 1, wherein a direct esterification reaction is used in step (a).

9. The process of claim 1, wherein an ester exchange reaction is used in step (a).

10. The process of claim 2, wherein a direct esterification reaction is used in step (a).

11. The process of claim 2, wherein an ester exchange reaction is used in step (a).

12. The process of claim 5, wherein a direct esterification reaction is used in step (a).

13. The process of claim 5, wherein an ester exchange reaction is used in step (a).

14. The process of claim 6, wherein a direct esterification reaction is used in step (a).

15. The process of claim 6, wherein an ester exchange reaction is used in step (a).

16. The process of claim 7, wherein a direct esterification reaction is used in step (a).

17. The process of claim 7, wherein an ester exchange reaction is used in step (a).

* * * * *